United States Patent

Shinde et al.

(10) Patent No.: US 10,947,993 B2
(45) Date of Patent: Mar. 16, 2021

(54) THERMAL GRADIENT ATTENUATION STRUCTURE TO MITIGATE ROTOR BOW IN TURBINE ENGINE

(71) Applicant: General Electric Company, Schenectady, NY (US)

(72) Inventors: Kudum Shinde, Bangalore (IN); Praveen Sharma, Bangalore (IN); Shashank Suresh Puranik, Bangalore (IN); Shivam Mittal, Bangalore (IN); Charles Stanley Orkiszewski, Cincinnati, OH (US); Carl Lawrence MacMahon, Cincinnati, OH (US); Anthony Michael Metz, Harrison, OH (US); Brian Drummond, Swampscott, MA (US)

(73) Assignee: General Electric Company, Schenectady, NY (US)

( * ) Notice: Subject to any disclaimer, the term of this patent is extended or adjusted under 35 U.S.C. 154(b) by 377 days.

(21) Appl. No.: 15/822,507

(22) Filed: Nov. 27, 2017

(65) Prior Publication Data

US 2019/0162203 A1 May 30, 2019

(51) Int. Cl.
*F04D 29/58* (2006.01)
*F02C 3/13* (2006.01)
(Continued)

(52) U.S. Cl.
CPC .......... *F04D 29/584* (2013.01); *F01D 19/02* (2013.01); *F01D 25/10* (2013.01); *F01D 25/14* (2013.01);
(Continued)

(58) Field of Classification Search
CPC ...... F04D 29/403; F04D 29/58; F04D 29/584; F04D 29/5846; F04D 27/0223;
(Continued)

(56) References Cited

U.S. PATENT DOCUMENTS 2,655,308 A * 10/1953 Luttman ................. F02C 7/047
415/177
2,684,568 A 7/1954 Senger
(Continued)

FOREIGN PATENT DOCUMENTS

GB 1435906 A * 5/1976 ......... F04D 27/0215
GB 2117842 A 10/1983
JP 2000314325 A 11/2000

OTHER PUBLICATIONS

Diepolder, W., "Design Features and Procedures to Reduce the Phenomenon of HP—Rotor Bow on Jet Engines," retrieved on Sep. 23, 2009 from website, 12 pages http://www.mtu.de/en/technologies/engineering_news/development/33949Diepolder-September.pdf.

*Primary Examiner* — David E Sosnowski
*Assistant Examiner* — Wayne A Lambert
(74) *Attorney, Agent, or Firm* — Dority & Manning, P.A.

(57) ABSTRACT

Embodiments are generally provided of a gas turbine engine including a rotor assembly comprising a shaft extended along a longitudinal direction, in which a compressor rotor and a turbine rotor are each coupled to the shaft; a casing surrounding the rotor assembly, in which the casing defines a first opening radially outward of the compressor rotor, the turbine rotor, or both, and a second opening radially outward of the compressor rotor, the turbine rotor, or both; a first manifold assembly coupled to the casing at the first opening; a second manifold assembly coupled to the casing at the second opening, in which the first manifold, the casing, and the second manifold together define a thermal circuit in thermal communication with the rotor assembly; and a fluid flow device in fluid communication with the first manifold assembly, in which the fluid flow device provides a flow of fluid to the first manifold assembly and through the thermal circuit, and further wherein the flow of fluid egresses the thermal circuit at the second manifold assembly.

18 Claims, 6 Drawing Sheets

(51) Int. Cl.
*F04D 29/40* (2006.01)
*F01D 25/14* (2006.01)
*F01D 25/10* (2006.01)
*F01D 19/02* (2006.01)
*F04D 27/02* (2006.01)
*F02C 7/18* (2006.01)

(52) U.S. Cl.
CPC ............. *F02C 3/13* (2013.01); *F02C 7/18* (2013.01); *F04D 27/0223* (2013.01); *F04D 29/403* (2013.01); *F05D 2220/32* (2013.01); *F05D 2260/606* (2013.01); *F05D 2260/608* (2013.01); *F05D 2260/941* (2013.01)

(58) Field of Classification Search
CPC .......... F01D 19/02; F01D 25/10; F01D 25/12; F01D 25/14; F01D 11/24; F02C 7/16; F02C 7/18; F02C 3/13; F05D 2220/32; F05D 2260/606; F05D 2260/608; F05D 2260/94; F05D 2260/941
See application file for complete search history.

(56) References Cited

U.S. PATENT DOCUMENTS

| | | | | |
|---|---|---|---|---|
| 3,641,766 | A * | 2/1972 | Uehling | F02C 3/06 60/262 |
| 4,003,200 | A | 1/1977 | Zerlauth | |
| 4,291,531 | A | 9/1981 | Campbell | |
| 4,296,599 | A * | 10/1981 | Adamson | F02C 7/18 415/115 |
| 4,416,111 | A * | 11/1983 | Lenahan | F02C 7/18 415/115 |
| 4,452,037 | A | 6/1984 | Waddington et al. | |
| 4,462,204 | A * | 7/1984 | Hull | F01D 25/12 415/115 |
| 4,482,293 | A | 11/1984 | Perry | |
| 4,653,267 | A | 3/1987 | Brodell et al. | |
| 4,807,433 | A * | 2/1989 | MacLin | F01D 5/081 415/115 |
| 4,893,984 | A * | 1/1990 | Davison | F01D 11/24 415/116 |
| 5,205,115 | A * | 4/1993 | Plemmons | F01D 11/24 415/115 |
| 5,219,268 | A * | 6/1993 | Johnson | F01D 11/24 415/115 |
| 5,385,012 | A | 1/1995 | Rowe | |
| 5,439,353 | A | 8/1995 | Cook et al. | |
| 5,605,437 | A * | 2/1997 | Meylan | F01D 11/24 415/1 |
| 5,685,693 | A * | 11/1997 | Sexton | F01D 11/24 415/173.1 |
| 5,689,948 | A * | 11/1997 | Frutschi | F01K 21/042 60/39.17 |
| 5,965,240 | A | 10/1999 | Blackburn et al. | |
| 6,132,857 | A | 10/2000 | Campenois et al. | |
| 6,141,951 | A | 11/2000 | Krukoski et al. | |
| 6,190,127 | B1 | 2/2001 | Schmidt | |
| 6,422,807 | B1 | 7/2002 | Leach et al. | |
| 6,498,978 | B2 | 12/2002 | Leamy et al. | |
| 6,575,699 | B1 | 6/2003 | Jones | |
| 6,910,852 | B2 | 6/2005 | Simeone et al. | |
| 6,978,622 | B2 * | 12/2005 | Dittmann | F01D 25/12 60/782 |
| 7,329,084 | B2 * | 2/2008 | Dittmann | F01D 25/12 415/1 |
| 7,434,402 | B2 | 10/2008 | Paprotna et al. | |
| 7,510,778 | B2 | 3/2009 | Bernard et al. | |
| 7,708,518 | B2 | 5/2010 | Chehab | |
| 7,744,346 | B2 | 6/2010 | Schreiber et al. | |
| 7,752,847 | B2 | 7/2010 | Ceric et al. | |
| 7,766,610 | B2 | 8/2010 | Busekros et al. | |
| 7,780,410 | B2 | 8/2010 | Kray et al. | |
| 7,780,420 | B1 | 8/2010 | Matheny | |
| 7,785,063 | B2 | 8/2010 | McQuiggan et al. | |
| 7,798,767 | B2 | 9/2010 | Kondo et al. | |
| 7,805,839 | B2 | 10/2010 | Cammer | |
| 8,038,382 | B2 * | 10/2011 | Nigmatulin | F01D 11/20 415/1 |
| 8,061,971 | B2 | 11/2011 | Roush et al. | |
| 8,137,073 | B2 | 3/2012 | Guisti et al. | |
| 8,186,933 | B2 | 5/2012 | Doss et al. | |
| 8,240,975 | B1 | 8/2012 | Ryznic | |
| 8,257,017 | B2 * | 9/2012 | Down | F01D 11/24 415/1 |
| 8,776,530 | B2 | 7/2014 | Shirooni et al. | |
| 8,789,376 | B2 | 7/2014 | Coffinbeny | |
| 8,820,046 | B2 | 9/2014 | Ross et al. | |
| 9,091,173 | B2 | 7/2015 | Mosley et al. | |
| 9,121,309 | B2 | 9/2015 | Geiger | |
| 9,151,176 | B2 | 10/2015 | Chillar et al. | |
| 2001/0022933 | A1 * | 9/2001 | Bangert | F01D 25/26 415/1 |
| 2002/0173897 | A1 | 11/2002 | Leamy et al. | |
| 2007/0031249 | A1 | 2/2007 | Jones | |
| 2008/0253922 | A1 | 10/2008 | Trimmer et al. | |
| 2009/0025365 | A1 | 1/2009 | Schilling et al. | |
| 2009/0301053 | A1 | 12/2009 | Geiger | |
| 2010/0189551 | A1 | 7/2010 | Ballard, Jr. et al. | |
| 2010/0329863 | A1 | 12/2010 | Kray et al. | |
| 2011/0027096 | A1 | 2/2011 | Northfield | |
| 2011/0049297 | A1 | 3/2011 | Jevons et al. | |
| 2011/0182741 | A1 | 7/2011 | Alexander | |
| 2011/0211967 | A1 | 9/2011 | Deal et al. | |
| 2011/0229334 | A1 | 9/2011 | Alexander | |
| 2011/0232294 | A1 | 9/2011 | Ross et al. | |
| 2012/0003100 | A1 | 1/2012 | James et al. | |
| 2012/0301292 | A1 | 11/2012 | Deal et al. | |
| 2012/0316748 | A1 | 12/2012 | Jegu et al. | |
| 2013/0091850 | A1 | 4/2013 | Francisco | |
| 2014/0236451 | A1 | 8/2014 | Gerez et al. | |
| 2014/0373553 | A1 | 12/2014 | Zaccaria et al. | |
| 2015/0044022 | A1 | 2/2015 | Bagni et al. | |
| 2015/0047359 | A1 | 2/2015 | Maguire et al. | |
| 2015/0252729 | A1 | 9/2015 | Niggemeier et al. | |
| 2016/0001881 | A1 | 1/2016 | van der Westhuizen | |
| 2017/0191419 | A1 | 7/2017 | Bayraktar et al. | |
| 2017/0234166 | A1 | 8/2017 | Dube et al. | |
| 2017/0234447 | A1 | 8/2017 | Jennings et al. | |

* cited by examiner

THERMAL GRADIENT ATTENUATION STRUCTURE TO MITIGATE ROTOR BOW IN TURBINE ENGINE

FIELD

The present subject matter is directed generally to a system for mitigating thermal bowing in gas turbine engines.

BACKGROUND

Gas turbine engines, such as those providing propulsion for aircraft, generate heat at the rotor assemblies during operation. Following shutdown of the engine, the rotor assembly is stationary (i.e., not rotating), which generally results in asymmetric heat distribution or thermal gradients circumferentially and/or axially along the rotor assembly. Such thermal gradients may generally result in thermal bowing or bowed rotor, such as along the radial, axial, and/or circumferential directions. Bowed rotor results in relatively large eccentricity relative to one or more casings surrounding the rotor assembly. As such, when a rotor assembly resumes operation, such eccentricity may generally cause the rotor assembly to operate with undesirable magnitudes of vibrations such as to damage surrounding casings, bearing assemblies, load structures, etc. Furthermore, such operation of the engine may result in airfoil blade tips rubbing into the surrounding casing, resulting in damage to the blades, the casings, or both.

Known methods to mitigate bowed rotor include allowing the rotor assembly to rest until the thermal gradient has naturally decreased over time such as to remove or eliminate the bowed rotor condition. However, in various instances, an engine may need to restart sooner than free convection heat transfer may allow. As such, there is a need for systems for reducing the thermal gradient of the rotor assembly such as to mitigate rotor bow in gas turbine engines.

BRIEF DESCRIPTION

Aspects and advantages of the invention will be set forth in part in the following description, or may be obvious from the description, or may be learned through practice of the invention.

Embodiments are generally provided of a gas turbine engine including a rotor assembly comprising a shaft extended along a longitudinal direction, in which a compressor rotor and a turbine rotor are each coupled to the shaft; a casing surrounding the rotor assembly, in which the casing defines a first opening radially outward of the compressor rotor, the turbine rotor, or both, and a second opening radially outward of the compressor rotor, the turbine rotor, or both; a first manifold assembly coupled to the casing at the first opening; a second manifold assembly coupled to the casing at the second opening, in which the first manifold, the casing, and the second manifold together define a thermal circuit in thermal communication with the rotor assembly; and a fluid flow device in fluid communication with the first manifold assembly, in which the fluid flow device provides a flow of fluid to the first manifold assembly and through the thermal circuit, and further wherein the flow of fluid egresses the thermal circuit at the second manifold assembly.

In one embodiment, the fluid flow device is further in fluid communication with the second manifold assembly such as to define a substantially closed circuit fluid communication of the thermal circuit.

In another embodiment, the first opening and the second opening are each defined at the casing radially outward of the compressor rotor and the turbine rotor.

In yet another embodiment, the first opening at the casing is defined radially outward of the turbine rotor, in which the second opening at the casing is defined radially outward of the compressor rotor.

In still another embodiment, the fluid flow device defines a compressor system providing a pressurized flow of fluid to the first manifold assembly.

In one embodiment, the first opening is defined at the casing within approximately +/−90 degrees relative to top dead center from the axial centerline of the engine.

In another embodiment, the second opening is at the casing defined within approximately +/−90 degrees relative to top dead center from the axial centerline of the engine.

In yet another embodiment, the second opening is defined at the casing within approximately 90 degrees to approximately 270 degrees relative to top dead center from the axial centerline of the engine.

In still another embodiment, the second opening is defined at the casing within approximately 225 degrees to approximately 315 degrees relative to top dead center from the axial centerline of the engine.

In various embodiments, the fluid flow device is coupled to the first manifold assembly and the second manifold assembly. In one embodiment, the engine further defines a serial flow arrangement of the first manifold assembly, the fluid flow device, and the second manifold assembly. In another embodiment, the engine further defines a closed circuit serial flow arrangement of the casing, first manifold assembly, the fluid flow device, the second manifold assembly, and the casing.

In still various embodiments, the rotor assembly defines a vent opening in fluid communication with the thermal circuit. In various embodiments, the engine further includes a wall assembly coupled to the rotor assembly, the casing, or both. The wall assembly includes a moveable joint coupled to a wall. The moveable joint translates the wall to and from the vent opening at the rotor assembly, the second opening at the casing, or both. In one embodiment, the moveable joint of the wall assembly defines a guided rail coupled to the wall, in which the guided rail translates the wall to and from the vent opening at the rotor assembly, the second opening at the casing, or both. In another embodiment, the moveable joint of the wall assembly defines a hinge coupled to the wall. The hinge translates the wall to and from the vent opening at the rotor assembly, the second opening at the casing, or both.

In one embodiment, the engine further includes a valve assembly directing the flow of fluid in a first direction and mitigating a flow of fluid in a second direction opposite of the first direction.

In another embodiment, at least one of the first opening or the second opening defines a borescope port or a bleed port at the casing of the gas turbine engine.

In yet another embodiment, the fluid flow device provides an intermittent or continuous flow of fluid through the thermal circuit.

In still another embodiment, the flow of fluid defines a flow of air, water, an inert gas, or combinations thereof.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of gas turbine engines including systems for reducing the thermal gradient of a rotor assembly such as to mitigate rotor bow are generally provided. The engines generally provided herein define a thermal circuit through which a flow of fluid is provided to reduce the thermal gradient and mitigate or eliminate thermal bowing at the rotor assembly. Reducing the thermal gradient may include providing a relatively cool flow of fluid in thermal communication with a relatively warm section (e.g., upper circumferential half) of a rotor assembly; providing a relatively warm flow of fluid in thermal communication with a relatively cool section (e.g., lower circumferential half) of a rotor assembly; or enabling flow and egress from multiple openings at the engine. The embodiments generally shown and described herein may reduce a thermal gradient circumferentially or axially, or both, across the rotor assembly, thereby reducing or eliminating thermal bowing and enabling the engine to resume operation in a shorter period of time following shutdown in contrast to free convection heat transfer or engines without systems and structures such as described herein.

Figure 1:
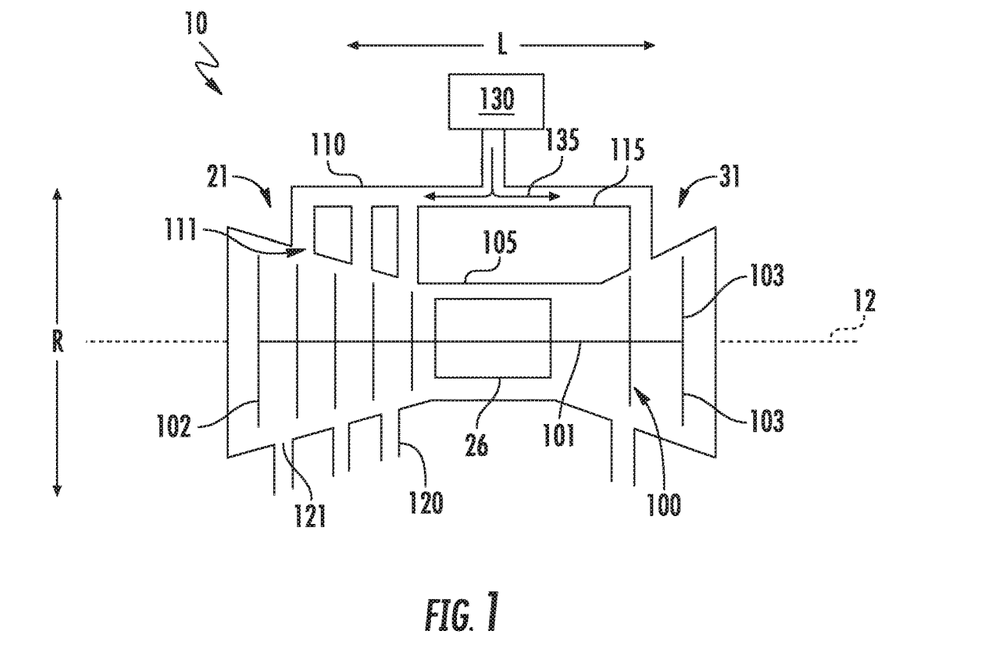
FIGS. 1-2 are schematic cross sectional views of exemplary embodiments of a gas turbine engine including a system for thermal gradient attenuation at a rotor assembly according to an aspect of the present disclosure.
Figure 2:
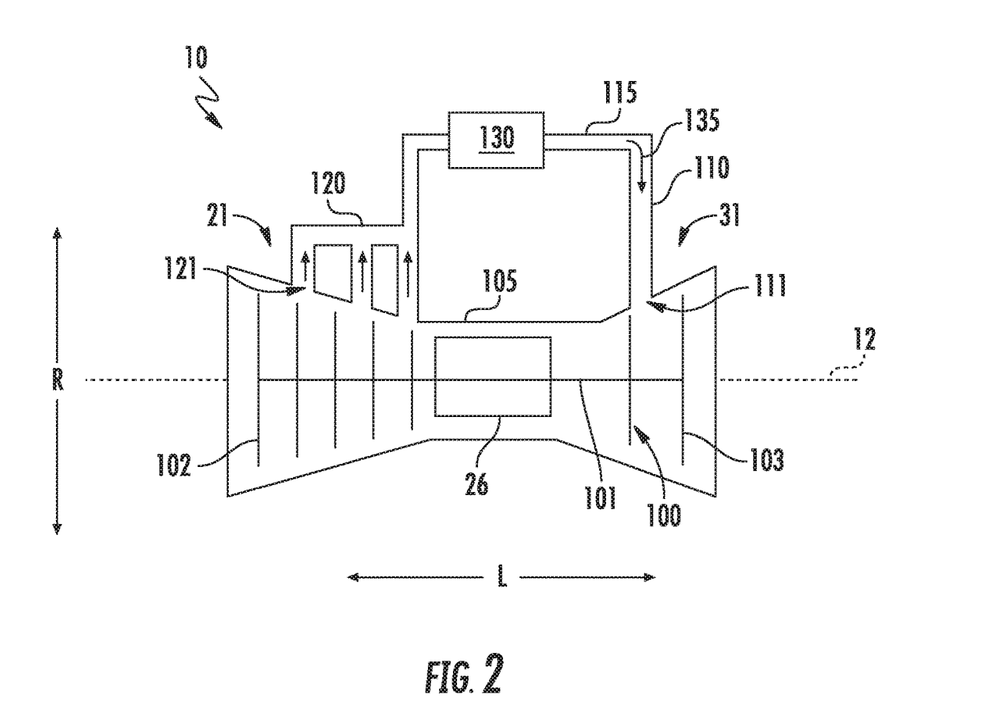

Referring now to the figures, FIGS. 1-2 are schematic views of exemplary embodiments of a gas turbine engine 10 according to an aspect of the present disclosure. The engine 10 defines a longitudinal direction L, a reference axial centerline 12 defined co-directional to the longitudinal direction L, and a radial direction R extended from the axial centerline 12. A circumferential direction C (FIGS. 3-4) is defined relative to the axial centerline 12. The engine 10 includes a compressor section 21, a combustion section 26, and a turbine section 31 in serial flow arrangement.

The engine 10 includes a rotor assembly 100 including a shaft 101 extended along the longitudinal direction L, The rotor assembly 100 includes a compressor rotor 102 and a turbine rotor 103 each coupled to the shaft 101. The compressor rotor 102 may include a disk or drum extended radially from the shaft 101. The compressor rotor 102 further includes a plurality of airfoils, such as installed or affixed to the disk or drum, or manufactured integrally to the disk (e.g., a bladed disk or integrally bladed rotor).

In various embodiments, the compressor section 21 includes one or more compressors in serial flow arrangement to one another. For example, the compressor section 21 may define a high pressure (HP) compressor. In other embodiments, the compressor section 21 may further define an intermediate and/or low pressure compressor. Each compressor is defined generally mechanically independent of one another, such that rotation of one does not necessarily induce rotation of another, except insofar as the compressors are in aerodynamic dependency due to the serial flow of fluid therethrough. However, it should be appreciated that in other embodiments, one or more compressors may be in mechanical dependency, such as via a speed change device (e.g., gear assembly). Still further, it should be appreciated that the compressor section 21 may further include a propeller or fan assembly. For example, the engine 10 may define a turbofan, turboprop, turbojet, etc. configuration.

In still various embodiments, the turbine section 31 includes one or more turbines in serial flow arrangement to one another. For example, the turbine section 31 may define a HP turbine. In other embodiments, the turbine section 31 may further define an intermediate and/or low pressure turbine. Each turbine is coupled to each compressor, such as described above, via one or more shafts 101, such as to define each rotor assembly 100 as generally mechanically independent of one another, except insofar as the turbines are in aerodynamic dependency due to serial flow of fluid therethrough. Similarly, it should be appreciated that in other embodiments one or more turbines and rotor assemblies 100 may be in mechanical dependency, such as via a speed change device.

Referring still to FIGS. 1-2, the engine 10 further includes a casing 105 surrounding the rotor assembly 100. The casing 105 defines a first opening 111 outward along the radial direction R of the compressor rotor 102, the turbine rotor 103, or both. The casing 105 further defines a second opening 121 outward along the radial direction R of the compressor rotor 102, the turbine rotor 103, or both. The casing 105 is defined generally annularly around the rotor assembly 100. In various embodiments, the first opening 111, the second opening 121, or both, are defined radially outward of the compressor rotor 102, the turbine rotor 103, or both. In one embodiment, at least one of the first opening 111 or the second opening 121 may define a borescope port or a bleed port at the casing 105 of the engine 10.

Various embodiments of the casing 105 further include shrouds and seals, such as abradable materials or other structures radially adjacent to the rotor assembly 100 such as to define a relatively closely formed primary flowpath across which air and combustion gases flow to generate thrust. The casing 105 may further define openings and passages within the casing 105 such as to define a secondary flowpath transferring a cooling fluid, such as from the compressor section 21 to the combustion section 26 and/or turbine section 31.

The casing 105 defines the first opening 111 and the second opening 121. Each opening 111, 121 may define a circular, ovular or racetrack, rectangular, or oblong opening through the casing 105 to provide fluid communication to and from the rotor assembly 100. The engine 10 includes a first manifold assembly 110 coupled to the casing 105 at the first opening 111. The engine 10 further includes a second manifold assembly 120 coupled to the casing 105 at the second opening 121. The first manifold 110, the casing 105, and the second manifold 120 together define a thermal circuit 115 in thermal communication with the rotor assembly 100.

Referring still to FIGS. 1-2, a fluid flow device 130 is in fluid communication with at least the first manifold assembly 110. The fluid flow device 130 provides a flow of fluid 135 to the casing 105. In various embodiments, the fluid flow device 130 provides the flow of fluid 135 to the casing 105 via the first manifold assembly 110 and through the thermal circuit 115. The flow of fluid 135 egresses the thermal circuit 115 via the second opening 121 through the second manifold assembly 120. The flow of fluid 135 may generally define air, such as, but not limited to, ambient outside air or air from an air cycle machine (ACM) provided from an environmental control system (ECS) or thermal management system (TMS) of an aircraft. The fluid flow device 130 may therefore define a pump or compressor system generating a pressurized flow of fluid 135 through the thermal circuit 115. In other embodiments, the fluid flow device 130 may define a vacuum system generating a flow of fluid 135 through the thermal circuit 115 such as by generating a vacuum. In still various embodiments, the flow of fluid 135 may define an inert gas, water, coolant, or combinations thereof. In still yet various embodiments, the fluid flow device 130 provides an intermittent or continuous flow of fluid 135 through the thermal circuit 115.

The fluid flow device 130 is coupled to the first manifold assembly 110 and the engine 10 to provide the flow of fluid 135 through the fluid flow device 130 and the engine 10. The flow of fluid 135 through the engine 10, or more specifically in thermal communication with the rotor assembly 100, reduces a thermal gradient across the rotor assembly 100. As such, the reduced thermal gradient may decrease or eliminate thermal bowing or bowed rotor of the rotor assembly 100. The reduced or eliminated thermal bowing enables the engine 10 to resume or restart operation without risks associated with eccentricity or distortion of the rotor assembly 100 relative to the surrounding casing 105 (e.g., hard rubs into the casing, rotor assembly unbalance, damaged airfoils, bearing compartment damage, etc.).

In various embodiments, the flow of fluid 135 enters the engine 10 in thermal communication with the rotor assembly 100 via the first opening 111. Referring to the exemplary embodiment generally provided in FIG. 1, the flow of fluid 135 egresses from the engine 10 via the second opening 121 at which the second manifold assembly 120 is coupled. The flow of fluid 135 through the engine 10, or more specifically in thermal communication with the rotor assembly 100, enables heat transfer from the rotor assembly 100 to the flow of fluid 135. The heated flow of fluid 135 then egresses the engine 10 at the second manifold assembly 120.

Figure 3:
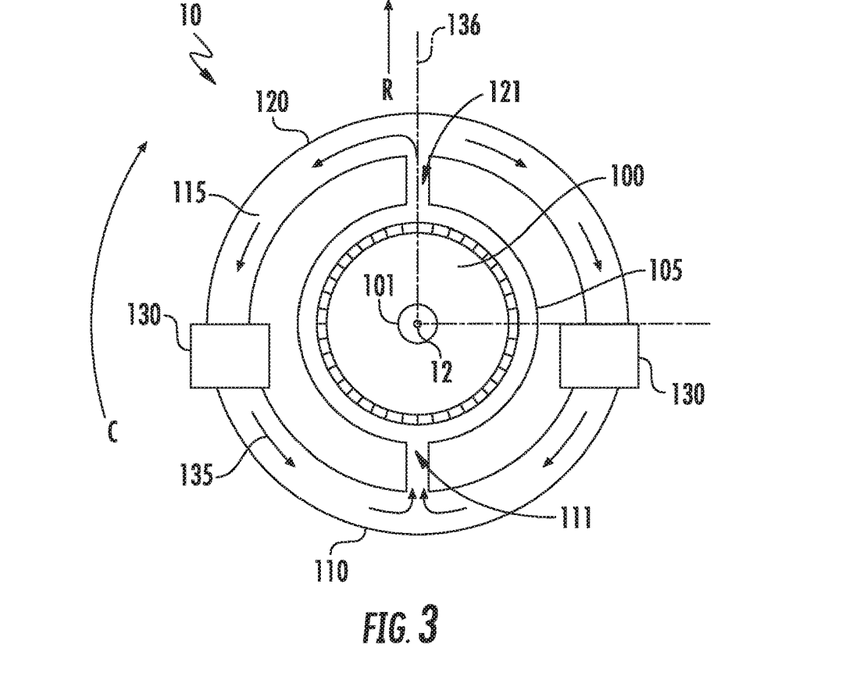
FIGS. 3-5 are cross sectional views of exemplary embodiments of the gas turbine engine generally provided in FIGS. 1-2.
Figure 4:
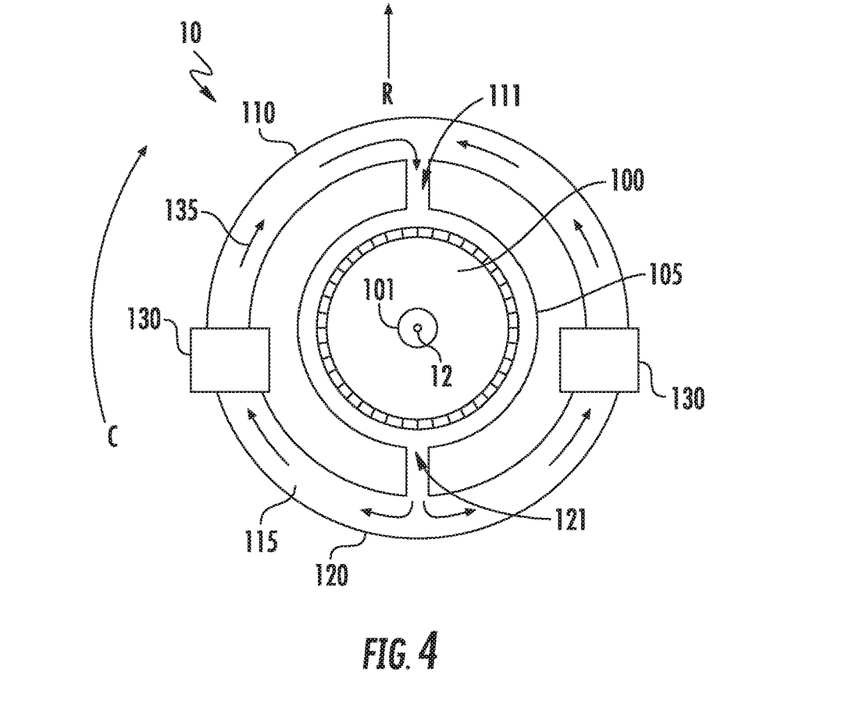

In another embodiment, such as generally provided in FIGS. 2-4, the fluid flow device 130 is further coupled in fluid communication with the second manifold assembly 120. The fluid flow device 130 coupled to the first manifold assembly 110 and the second manifold assembly 120 may substantially define a closed circuit fluid communication of the thermal circuit 115 through the engine 10. However, it should be appreciated that portions of the engine 10 may enable leakage of the flow of fluid 135 from other than the second opening 121, such that the thermal circuit 115 is at least partially open circuit.

Figure 6:
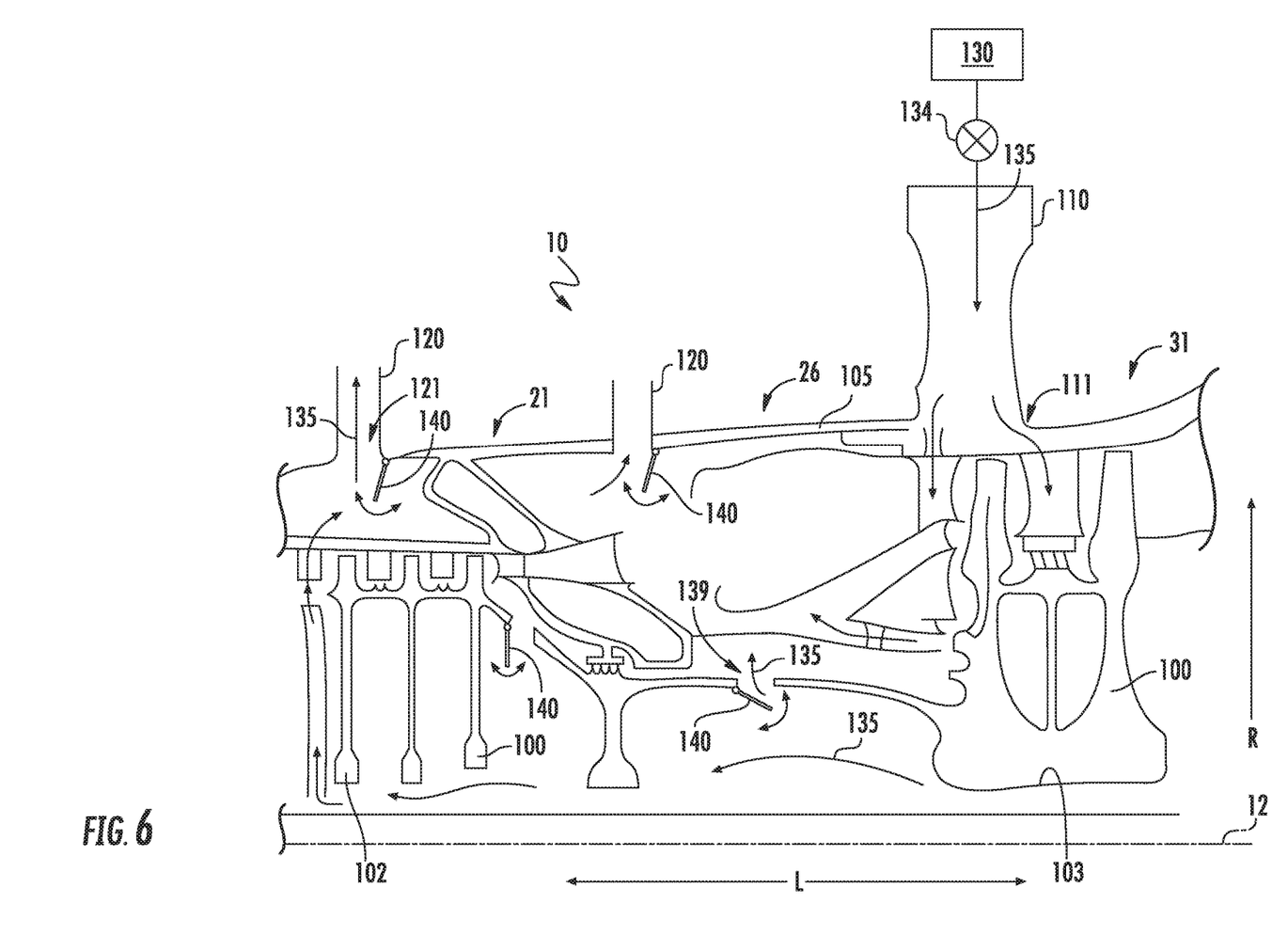
FIG. 6 is a cross sectional view of another exemplary embodiment of a portion of a gas turbine engine including a system for thermal gradient attenuation at a rotor assembly according to an aspect of the present disclosure.

Referring now to FIGS. 2 and 6, in various embodiments, the first opening 111 at the casing 105 is defined radially outward of the turbine rotor 103. The second opening 121 at the casing 105 is defined radially outward of the compressor rotor 102. The fluid flow device 130 may provide the flow of fluid 135 to and through the first manifold assembly 110 and into the engine 10 via the first opening 111. The first opening 111 is defined through the casing 105 at the turbine section 31, such as generally outward along the radial direction R of the turbine rotor 103. The flow of fluid 135 flows in thermal communication with the turbine rotor 103 toward the compressor section 21. The flow of fluid 135 may receive thermal energy (e.g., heat) from the turbine section 31 and transfer thermal energy to the compressor rotor 102, the shaft 101, or both, such as to reduce the thermal gradient across the rotor assembly 100. For example, the flow of fluid 135 may reduce a temperature of the rotor assembly 100 at the turbine section 31 and increase a temperature of the rotor assembly 100 at the compressor section 21 such that a difference in low and high temperature of the rotor assembly 100 is reduced. As such, the reduced thermal gradient may mitigate thermal bowing of the rotor assembly 100.

Figure 5:
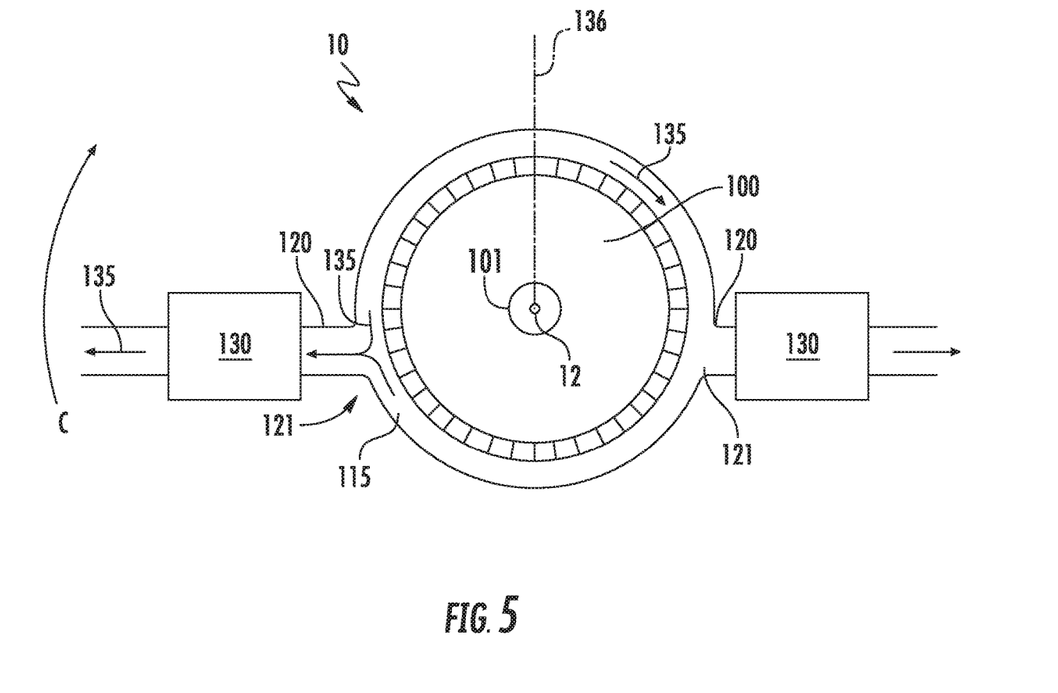

Referring now to FIGS. 3-5, cross sectional views of embodiments of the engine 10 are generally provided. In the various embodiments generally provided, the fluid flow device 130 is coupled to the first manifold assembly 110 and the second manifold assembly 120. In one embodiment, the engine 10 defines the thermal circuit 115 in a serial flow arrangement of the first manifold assembly 110, the fluid flow device 130, and the second manifold assembly 120. In another embodiment, the engine 10 further defines the thermal circuit 115 in a closed circuit serial flow arrangement of the casing 105, first manifold assembly 110, the fluid flow device 130, the second manifold assembly 120, and the casing 105.

In one embodiment, such as provided in FIG. 3, the fluid flow device 130 removes the flow of fluid 135 from the engine 10 through the second manifold 120 via the second opening 121 defined through the casing 105 at a first circumferential portion of the engine 10. The fluid flow device 130 directs or flows the fluid 135 through the thermal circuit 115 into the engine 10 through the first manifold 110 via the first opening 111 defined through the casing 105 at a second circumferential portion of the engine 10. For example, the fluid flow device 130 may remove a relatively higher temperature flow of fluid 135 from the engine 10 from an upper half (e.g., between approximately +/−90 degrees relative to a top dead center reference line 136 extended along the radial direction R from the axial centerline 12). The fluid flow device 130 may direct the flow of fluid 135 from the upper half of the engine 10 to a lower half of the engine 10 such as to approximately uniformly distribute thermal energy (e.g., heat) circumferentially around the rotor assembly 100. As such, the thermal gradient is reduced along the rotor assembly 100, thereby reducing or eliminating thermal bowing of the rotor assembly 100.

In one embodiment, referring still to FIG. 3, the second opening 121 is defined at the casing 105 within approximately +/−90 degrees relative to the top dead center reference line 136 from the axial centerline 12 of the engine 10. In another embodiment, the first opening 121 is defined at the casing 105 within approximately +/−45 degrees relative to the top dead center reference line 136.

In another embodiment, such as generally provided in FIG. 4, the fluid flow device 130 removes a generally cooler flow of fluid 135 from the engine 10 through the second manifold 120 via the second opening 121 defined through the casing 105. For example, the fluid flow device 130 may remove the relatively cooler flow of fluid 135 from the lower half (e.g., between approximately 90 degrees and approximately 270 degrees relative to top dead center reference line 136, or between approximately +/−90 degrees relative to bottom dead center). The fluid flow device 130 may direct the flow of fluid 135 from the lower half of the engine 10 to the upper half of the engine 10 such as to approximately uniformly provide cooler flow fluid 135 to the relatively warmer upper half of the rotor assembly 100, thereby reducing or eliminating thermal bowing of the rotor assembly 100.

Referring now to FIG. 5, in another exemplary embodiment, the second opening 121 is defined at the casing 105 within approximately 45 degrees to approximately 135 degrees relative to top dead center reference line 136 from the axial centerline 12 of the engine 10. In still another embodiment, the second opening 121 is defined at the casing 105 within approximately 225 degrees to approximately 315 degrees relative to top dead center 136 from the axial centerline 12 of the engine 10. For example, the fluid flow device 130 may be disposed to pull or vacuum the flow of fluid 135 from the casing 105 and rotor assembly 100 to a sink (e.g., ambient air, a heat exchanger, etc.). In other embodiments, such as generally provided in FIG. 1, the fluid flow device 130 may provide a pressurized flow of fluid 135 that then ejects the flow of fluid 135 from the second opening 121, such as generally provided in FIG. 5.

Referring now to FIG. 6, the engine 10 may further include a valve assembly 134 directing the flow of fluid 135 in a first direction and mitigating the flow of fluid 135 in a second direction opposite of the first direction. For example, the valve assembly 134 may define a one-way valve configured to enable the flow of fluid 135 from the fluid flow device 130 to the casing 105 of the engine 10. The valve assembly 134 may further disable the flow of fluid 135 or another fluid from the engine 10 back into the fluid flow device 130. For example, during engine operation, the valve assembly 134 may be utilized at the thermal circuit 115 to prevent backflow that may be adverse to engine operation at idle conditions or greater.

Figure 7A:
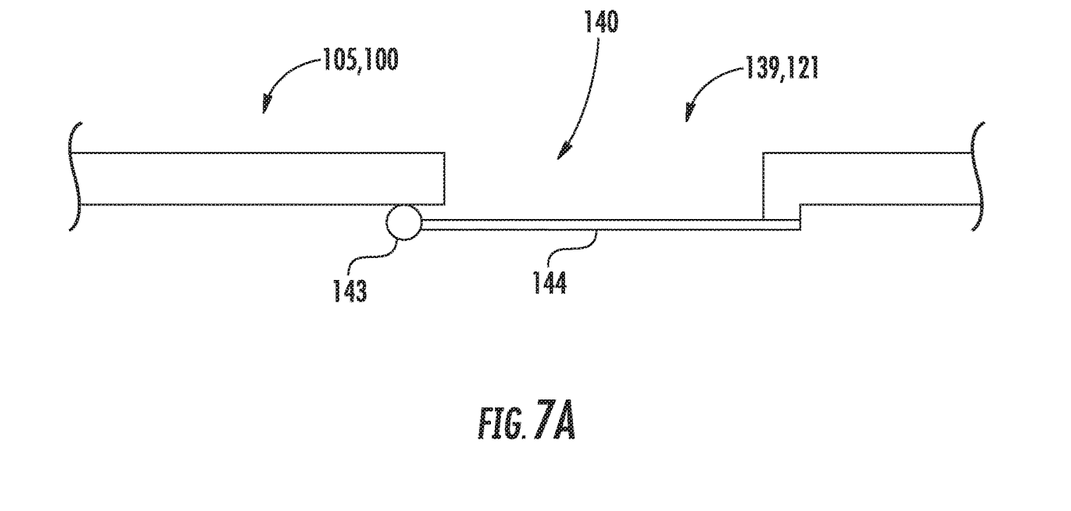
FIGS. 7A and 7B are views of exemplary embodiments a portion of the gas turbine engine generally provided in FIG. 6.
Figure 7B:
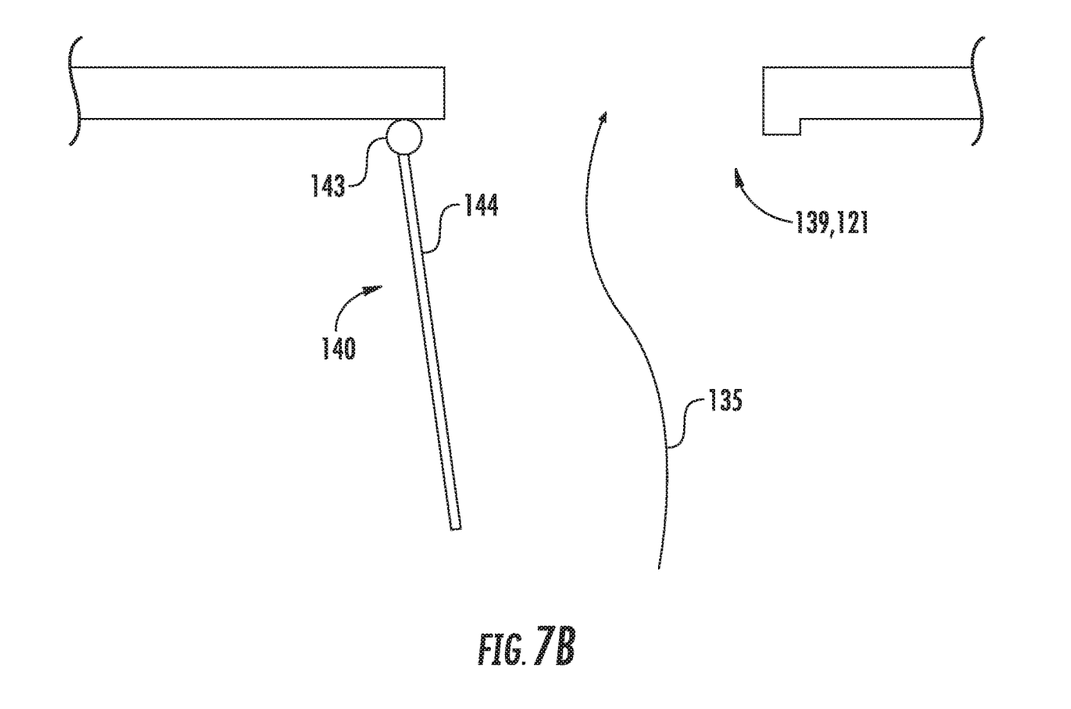
Figure 8A:
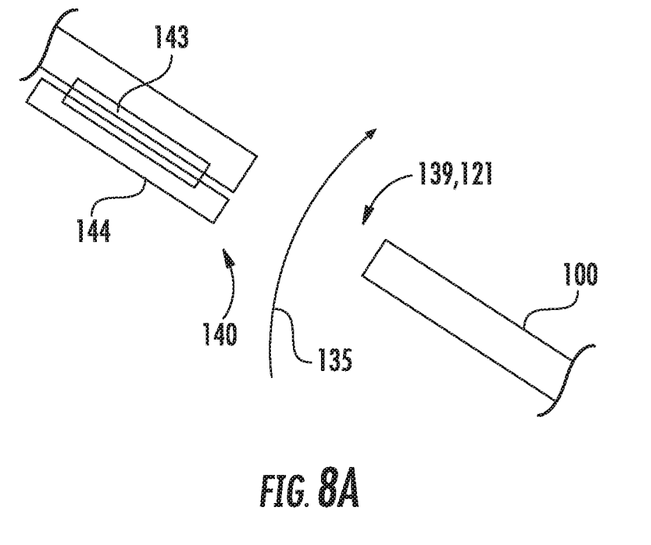
FIGS. 8A and 8B are views of another exemplary embodiment of a portion of the gas turbine engine generally provided in FIG. 6.
Figure 8B:
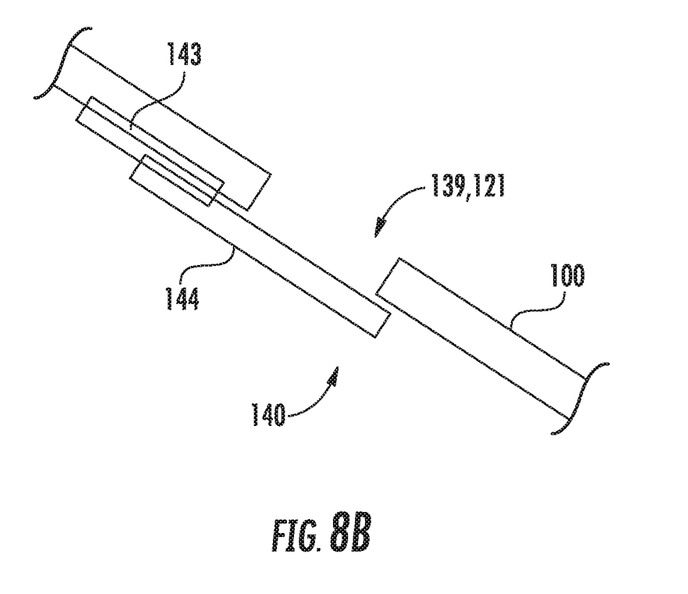

Referring still to FIG. 6, the engine 10 may further define one or more vent openings 139 in fluid communication within the thermal circuit 115 at the rotor assembly 100. The vent opening 139 may generally define an orifice or opening, such as defining a circular, rectangular, ovular or racetrack, polygonal, or oblong cross section. In various embodiments, the engine 10 further includes a wall assembly 140 coupled to the rotor assembly 100, the casing 105, or both. Referring now to FIGS. 7-8, exemplary embodiments of a portion of the engine 10 including the wall assembly 140 are generally provided. The wall assembly 140 includes a moveable joint 143 coupled to a wall 144. The moveable joint 143 translates the wall 144 to and from the vent opening 139 at the rotor assembly 100, the second opening 121 at the casing 105, or both.

In various embodiments, the moveable joint 143 defines spring properties. For example, in one embodiment, when the engine 10 is at or near a stationary condition (e.g., zero rotation of the rotor assembly 100, or at a sub-idle condition or portion thereof), the moveable joint 143 defines, at least in part, a spring configured to keep the wall 144 open or unobstructed from the vent opening 139. In such an embodiment, the moveable joint 143 may define, at least in part, a tension spring in which pressure or forces (e.g., centrifugal forces) act upon the moveable joint 143 to close the vent openings 139 via the wall 144 of the moveable joint 143 at one or more conditions above stationary or static (e.g. approximately zero RPM of the rotor assembly 100), or at or above one or more sub-idle or idle conditions of the engine 10.

In other embodiments, the moveable joint 143 may define, at least in part, a compression spring in which pressure or forces act upon the moveable joint 143 to open the vent openings 139 via the wall 144 of the moveable joint 143 at one or more conditions above stationary or static, or at or above one or more sub-idle or idle conditions of the engine 10.

As such, in various embodiments, the moveable joint 143 may be disposed at an inner radius of the rotor assembly 100 or the casing 105. In other embodiments, the moveable joint 143 may be disposed at an outer radius of the rotor assembly 100 or casing 105. In still various embodiments, the moveable joint 143 may define, at least in part, a constant load spring, a variable resistance spring, a variable stiffness spring, or a torsion spring.

Referring to FIGS. 7A and 7B, the moveable joint 143 of the wall assembly 140 defines a hinge coupled to the wall 144. The hinge translates the wall 144 to and from the vent opening 139 at the rotor assembly 100, the second opening 121 at the casing 105, or both. For example, as engine conditions change (e.g., rotational speed of the rotor assembly 100, or flow characteristics such as pressure, temperature, or flow rate of the fluid 135) the hinge may close or open as a function of changes in engine condition, such as centrifugal loads at the rotor assembly 100, or flow characteristics of the flow of fluid 135. Referring to FIGS. 8A and 8B, the moveable joint 143 of the wall assembly 140 defines a guided rail coupled to the wall 144. The guided rail translates the wall 144 to and from the vent opening 139 at the rotor assembly 100, the second opening 121 at the casing 105, or both. In various embodiments, the guided rail or hinge of the wall assembly 140 may define, at least in part, a spring, such as described herein.

For example, as generally provided in FIG. 7A and FIG. 8A, the wall 144 closes against the casing 105 or rotor assembly 100 to prevent flow of fluid from passing through the thermal circuit 115 during certain engine conditions, such as above idle condition. As the engine condition decreases, such as below idle condition, the wall assembly 140 translates the wall 144 via the moveable joint 143 to enable the flow of fluid 135 to egress through the vent opening 139 or second opening 121, such as generally provided in FIGS. 7B and 8B.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining an axial centerline and a longitudinal direction extended co-directional thereto and a radial direction extended from the axial centerline, the engine comprising:
   a rotor assembly comprising a shaft extended along the longitudinal direction, wherein a compressor rotor and a turbine rotor are each coupled to the shaft;
   a casing surrounding the rotor assembly, wherein the casing defines a first opening positioned directly outward of the turbine rotor in the radial direction, and a second opening positioned directly outward of the compressor rotor in the radial direction;
   a first manifold assembly coupled to the casing at the first opening;
   a second manifold assembly coupled to the casing at the second opening, wherein the first manifold assembly, the casing, and the second manifold assembly together define a thermal circuit in thermal communication with the rotor assembly; and
   a fluid flow device in fluid communication with the first manifold assembly,
   wherein the fluid flow device provides a flow of fluid to the first manifold assembly and through the thermal circuit, and
   further wherein the flow of fluid egresses from the thermal circuit at the second manifold assembly.

2. The gas turbine engine of claim 1, wherein the fluid flow device is further in fluid communication with the second manifold assembly such as to define a substantially closed circuit fluid communication of the thermal circuit.

3. The gas turbine engine of claim 1, wherein the fluid flow device defines a compressor system providing a pressurized flow of fluid to the first manifold assembly.

4. The gas turbine engine of claim 1, wherein the first opening is defined at the casing within approximately +/−90 degrees relative to top dead center from the axial centerline of the engine.

5. The gas turbine engine of claim 1, wherein the second opening is at the casing defined within approximately +/−90 degrees relative to top dead center from the axial centerline of the engine.

6. The gas turbine engine of claim 1, wherein the second opening is defined at the casing within approximately 90 degrees to approximately 270 degrees relative to top dead center from the axial centerline of the engine.

7. The gas turbine engine of claim 1, wherein the second opening is defined at the casing within approximately 225 degrees to approximately 315 degrees relative to top dead center from the axial centerline of the engine.

8. The gas turbine engine of claim 1, wherein the fluid flow device is coupled to the first manifold assembly and the second manifold assembly.

9. The gas turbine engine of claim 8, further defining a serial flow arrangement of the first manifold assembly, the fluid flow device, and the second manifold assembly.

10. The gas turbine engine of claim 8, further defining a closed circuit serial flow arrangement of the casing, first manifold assembly, the fluid flow device, the second manifold assembly, and the casing.

11. The gas turbine engine of claim 1, wherein the rotor assembly defines a vent opening in fluid communication with the thermal circuit.

12. The gas turbine engine of claim 11, further comprising:
   a wall assembly coupled to the rotor assembly, the casing, or both, wherein the wall assembly comprises a moveable joint coupled to a wall, and wherein the moveable joint translates the wall to and from the vent opening at the rotor assembly, the second opening at the casing, or both.

13. The gas turbine engine of claim 12, wherein the moveable joint of the wall assembly defines a guided rail coupled to the wall, wherein the guided rail translates the wall to and from the vent opening at the rotor assembly, the second opening at the casing, or both.

14. The gas turbine engine of claim 12, wherein the moveable joint of the wall assembly defines a hinge coupled to the wall, wherein the hinge translates the wall to and from the vent opening at the rotor assembly, the second opening at the casing, or both.

15. The gas turbine engine of claim 1, further comprising:
   a valve assembly directing the flow of fluid in a first direction and mitigating a flow of fluid in a second direction opposite of the first direction.

16. The gas turbine engine of claim 1, wherein at least one of the first opening or the second opening defines a borescope port or a bleed port at the casing of the gas turbine engine.

17. The gas turbine engine of claim 1, wherein the fluid flow device provides an intermittent or continuous flow of fluid through the thermal circuit.

18. The gas turbine engine of claim 1, wherein the flow of fluid defines a flow of air, water, an inert gas, or combinations thereof.

* * * * *